US008869122B2

(12) United States Patent
Pendap et al.

(10) Patent No.: US 8,869,122 B2
(45) Date of Patent: Oct. 21, 2014

(54) EXTENSIBLE EXECUTABLE MODELING

(75) Inventors: Santosh Dattu Pendap, Fremont, CA (US); Sergey Babkin, Lithia Springs, GA (US); Palaniappan Gandhi, Jr., Flossmoor, IL (US); Mohyuddin Rehmattullah, Fremont, CA (US); Manbeen P. Kohli, Waterloo (CA); Gregory L. Shtilman, Redondo Beach, CA (US); Andrzej Kucharczyk, Waterloo (CA); Joseph Michael Skrzypczak, Kitchener (CA); Kyle James Dohring, Waterloo (CA); Vincent Roy Garofalo, Waterloo (CA); Raphael Hercules Sutton, Oakley, CA (US)

(73) Assignee: Sybase, Inc., Dublin, CA (US)

( * ) Notice: Subject to any disclaimer, the term of this patent is extended or adjusted under 35 U.S.C. 154(b) by 97 days.

(21) Appl. No.: 13/598,952

(22) Filed: Aug. 30, 2012

(65) Prior Publication Data

US 2014/0068576 A1   Mar. 6, 2014

(51) Int. Cl.
  *G06F 9/45* (2006.01)
(52) U.S. Cl.
  USPC ............................................. 717/141

(58) Field of Classification Search
  USPC ........................................................ 717/141
  See application file for complete search history.

(56) References Cited

U.S. PATENT DOCUMENTS

| | | | |
|---|---|---|---|
| 2008/0120283 A1* | 5/2008 | Liu et al. ........................ 707/4 |
| 2008/0196006 A1* | 8/2008 | Bates et al. ................. 717/109 |
| 2008/0301135 A1* | 12/2008 | Alves et al. ..................... 707/6 |
| 2009/0070765 A1* | 3/2009 | Alves et al. .................. 718/103 |
| 2010/0250564 A1* | 9/2010 | Agarwal et al. .............. 707/756 |
| 2011/0161352 A1* | 6/2011 | de Castro Alves et al. ... 707/769 |
| 2011/0196891 A1* | 8/2011 | de Castro Alves et al. ... 707/769 |
| 2011/0307552 A1* | 12/2011 | Sarmah ........................ 709/204 |
| 2013/0117305 A1* | 5/2013 | Varakin et al. ............... 707/769 |
| 2013/0204896 A1* | 8/2013 | Jimenez Peris et al. ...... 707/774 |

* cited by examiner

*Primary Examiner* — John Chavis
(74) *Attorney, Agent, or Firm* — Sterne, Kessler, Goldstein & Fox P.L.L.C.

(57) ABSTRACT

Methods, systems, and computer program products for generating executable computer code in an extensible format are provided. A computer-implemented method may include receiving computer source code for compilation and compiling the source code, to generate executable computer code in an extensible format that includes instructions for execution by a computer system configured to process the instructions in the extensible format.

21 Claims, 7 Drawing Sheets

EXTENSIBLE EXECUTABLE MODELING

BACKGROUND

1. Technical Field

Embodiments generally relate to software applications.

2. Background Art

Historically, businesses were most concerned about adequate storage, retrieval, and analysis of data. Today, businesses operate in environments where having the ability to monitor and respond to changing events has become increasingly important.

Event-driven systems typically have been built around relational databases, real-time messaging systems, or a combination of both. While these technologies have their advantages, neither is particularly well suited for managing and analyzing events in rapidly changing environments.

For example, relational databases process large amounts of data and analyze information with relative ease. However, relational databases are not designed to operate in real-time environments and do not provide effective ways of monitoring rapidly changing data. Messaging systems offer real-time data monitoring, but generally are not capable of providing complex computations, correlations, pattern matching or referencing of historical data.

Custom applications must be integrated with these technologies to create viable solutions. However, relying on such applications to compensate for technological limitations creates new challenges. For example, custom applications are complex, costly to build and modify, and do not scale well as organizational needs change.

BRIEF SUMMARY

Embodiments generally relate to software applications and are generally illustrated in the context of event stream processing. In one embodiment, a computer-implemented method may include receiving computer source code for compilation and compiling the source code to generate executable computer code in an extensible format that includes instructions for execution by a computer system configured to process the instructions in the extensible format.

In another embodiment, a system for generating executable computer code in an extensible format includes one or more processors and a module configured to receive, using the one or more processors, source code for compilation. The system also includes a module configured to compile the source code, using the one or more processors, to generate executable computer code in an extensible format that includes instructions for execution by a computer system configured to process the instructions in the extensible format.

In an additional embodiment, a computer readable medium has instructions stored thereon that when executed by a processor, cause the processor to perform operations to generate executable computer code in an extensible format. The instructions include computer-readable program code to cause the processor to receive source code for compilation. The instructions also include computer-readable program code to cause the processor to compile the source code to generate executable computer code that includes instructions for execution by a computer system configured to process the instructions in the extensible format.

Further embodiments, features, and advantages, as well as the structure and operation of the various embodiments, are described in detail below with reference to accompanying drawings.

BRIEF DESCRIPTION OF THE DRAWINGS/FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

Figure 1:
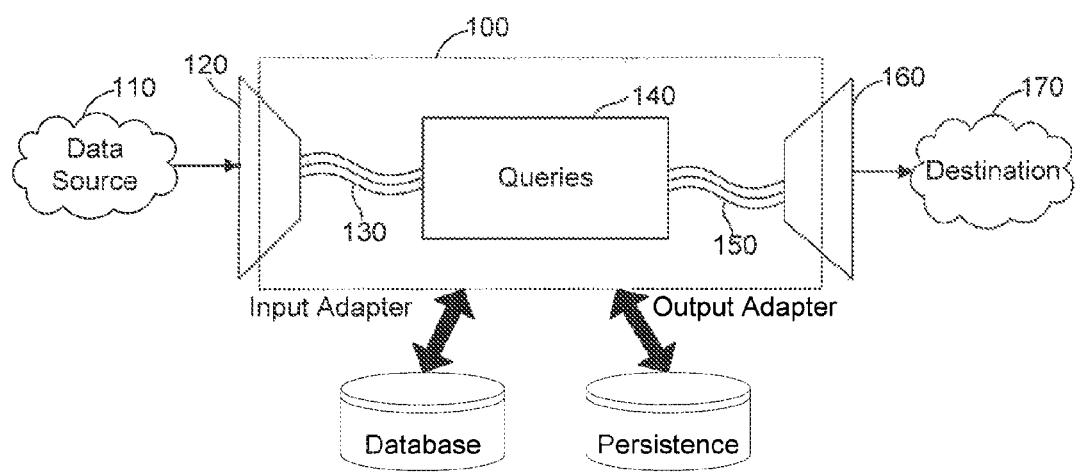
FIG. 1 illustrates components of an end-to-end application incorporating a complex event processing engine, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While embodiments are described herein with reference to illustrative applications, it should be understood that the invention is not limited thereto. Those skilled in the art with access to the teachings provided herein will recognize additional modifications, applications, and embodiments within the scope thereof and additional fields in which embodiments of the invention would be of significant utility.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic with other embodiments whether or not explicitly described.

Various embodiments include methods, systems, and computer program products for generating executable computer code in an extensible format. For example, a compiler may receive application source code designed to perform event stream processing. The compiler may then analyze the source code, determine one or more optimizations, and generate optimized executable computer code in an XML format. The extensible executable computer code may then be executed by a computer system configured to process instructions and logic provided according to the format.

Formatting executable computer code as XML allows the compiler to organize and reuse common logic within an application and potentially across one or more other applications. The XML format is platform independent, promotes reuse, facilitates optimizations, is human-readable, and may be executed on any computer system platform configured to implement logic and instructions provided in such a format.

FIG. 1 illustrates components of an end-to-end application incorporating complex event processing engine 100, according to an embodiment. Messages travel through the application starting from external data source 110 to input adapter 120. Input adapter 120 may poll data source 110, register for notifications, and/or use some other mechanism to receive data. Input adapter 120 publishes messages to one or more data streams 130. Data streams 130 feed projects and one or more query modules 140. Query modules 140 publish to one or more output streams 150. Output streams 150 then feed output adapter 160. Output adapter 160 subscribes to output streams 150, processes messages, converts data to a format suitable for destination 170, and then transmits output data to destination 170.

In an embodiment, input and output adapters enable complex event processing engine 100 to send and receive messages to and from both static and dynamic data sources and destinations. External sources and destinations may include, but are not limited to, data feeds, sensor devices, messaging systems, radio frequency identification (RFID) readers, e-mail servers, relational databases, etc.

By way of example and without limitation, a series of input adapters 120 may translate messages from one or more data source 110, such as a temperature sensor, bar code scanner and a Java Message Service (JMS) "cloud", into formats compatible with complex event processing engine 100 for processing by complex event processing queries 140 with output adapters 160 converting the result rows into updates for one or more destination 170, such as a database server, e-mail server, messaging system, and/or data for a web services dashboard.

Complex event processing engine 100 may process hundreds of thousands of messages per second, with latency measured in milliseconds and may run on a single processor, or may consist of multiple servers (i.e., a server cluster) distributed across multiple machines, each containing one or more processors.

Figure 2:
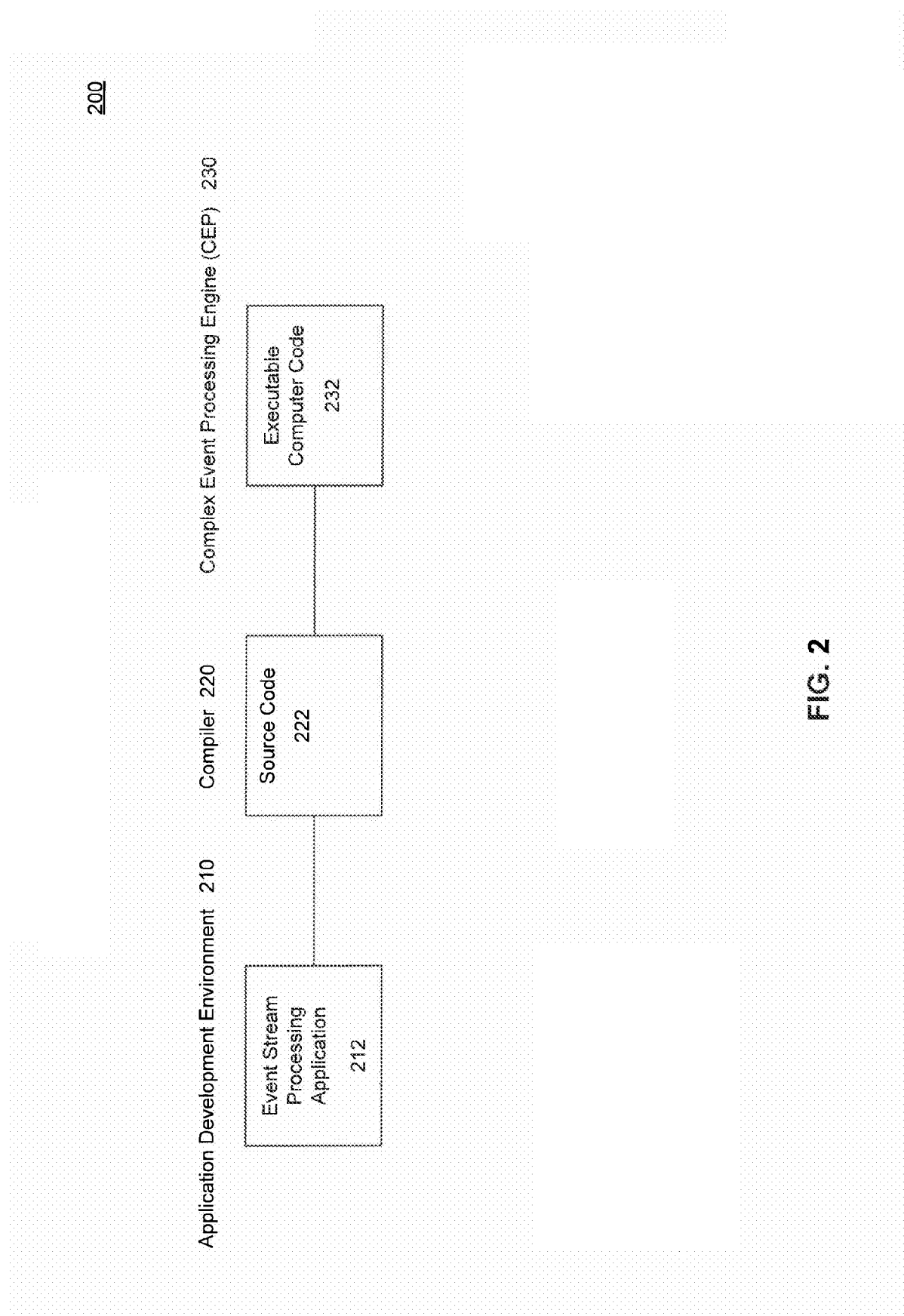
FIG. 2 is an example framework for generating executable computer code in an extensible format, according to an embodiment.

FIG. 2 is an example framework for generating executable computer code in an extensible format, in accordance with an embodiment. Framework 200 defines application development environment 210, event stream processing application 212, compiler 220, source code 222, Complex Event Processing (CEP) engine 230, and executable computer code 232. One skilled in the relevant arts will appreciate that the arrangement shown in framework 200 is presented by way of example, and not limitation.

In an embodiment, application development environment 210 may be used to create event stream processing application 212, which may include computer source code 222 written in one or more computer languages. In other embodiments, event stream processing application 212 may be created in other ways (i.e., textually or using code generation, etc.), independent of an application development environment 212.

In another embodiment, event stream processing application 212 may use a computer language specifically designed to perform one or more aspects of event stream processing. For example, and without limitation, event stream processing application 212 may use or be written using Sybase Complex Event Processing (CEP) Continuous Computation Language (CCL) to perform event stream processing.

In a further embodiment, event stream processing application 212 may be written using any computer language, such as CCL, having the ability to continually process incoming, dynamic data. For example, a "continuous" query may execute continually, remain active indefinitely, and execute each time data arrives from a data source 110.

In an embodiment, source code 222, such as CCL code, is converted into executable computer code 232 by compiler 220. Compiler 220 compiles source code 222 into executable computer code 232, which may be executed on any of one or more computer systems, such as a Complex Event Processing (CEP) engine 230. Executable computer code 232 may exist in any format that can be executed by a computer system and/or a CEP engine 230 running on a computer system (i.e., binary, opcode, XML, etc.).

In alternative embodiment, compiler 220 first compiles source code 222 into at least one intermediate form, such as bytecode, before rendering executable computer code 232 as executable XML. In another alternative embodiment, source code 222 and/or executable computer code 232 may be encrypted for security. In other embodiments, application processing logic, instructions, and/or any ordered set of steps for execution) may be represented in an extensible format. This includes, but is not limited to, complex event processing/event stream processing applications.

For example, source code containing application logic and instructions for any type of program may be represented in an extensible format, which can be executed by a computer system configured to process and implement the application logic and instructions provided in the extensible format, which is not fixed. In another example, other types of logic and instructions, such as query plans and bytecode may be compiled into an extensible format for execution.

Compiler 220 is typically available as part of application development environment 210. However, source code compilation may occur in a variety of ways. According to other embodiments, compilation of source code 222 may be performed by invoking compiler 220 from a command line or by an API call using an available software development kit. In further embodiments, application development environment may be integrated with compiler 220 in other ways that allow compilation of source code 222 into executable computer code 232.

Figure 3:
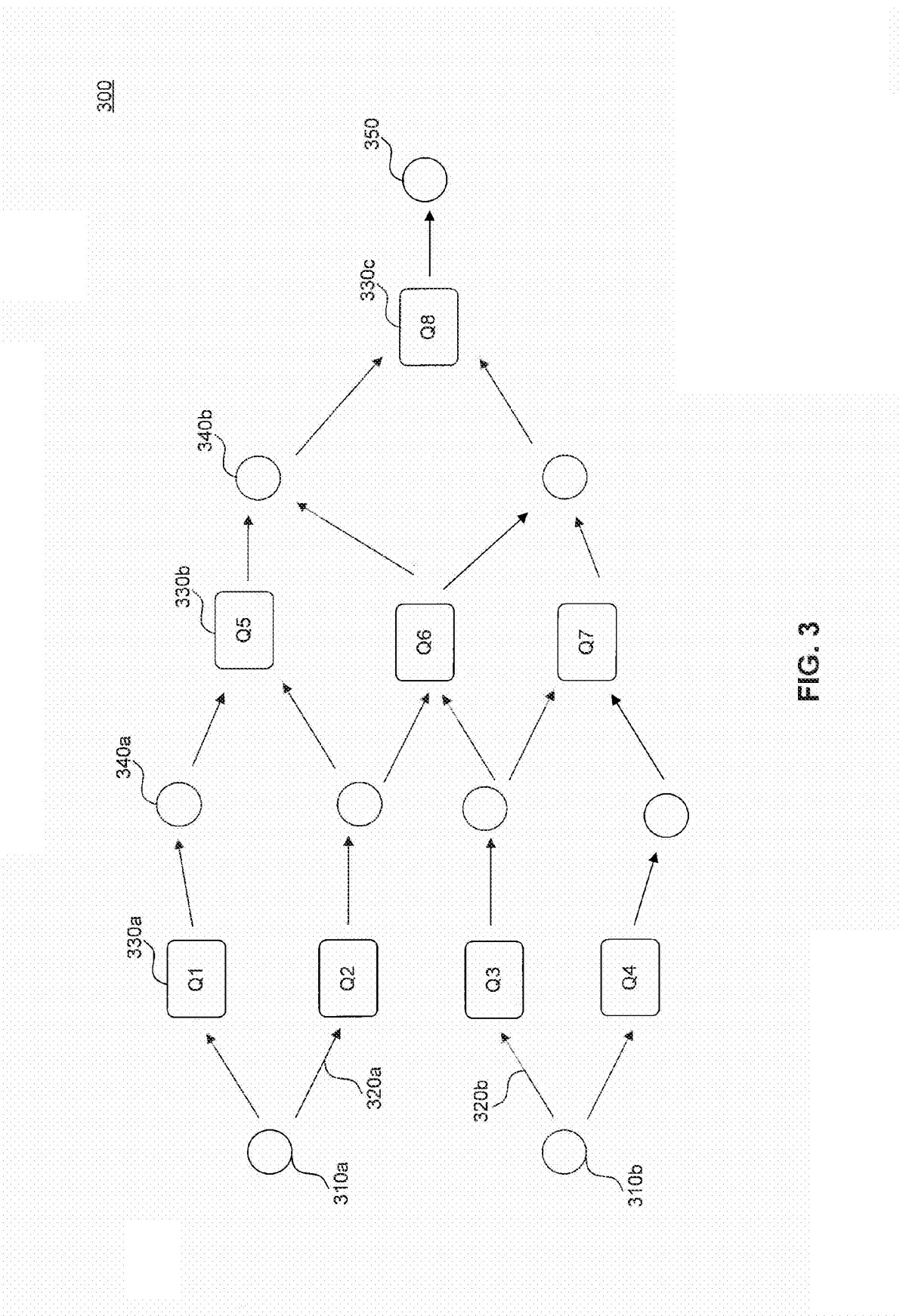
FIG. 3 is a diagram illustrating an event stream processing data flow, according to an embodiment.

FIG. 3 is a diagram illustrating event stream processing using a data flow approach, according to an embodiment. The example of diagram 300 includes source nodes (310a and 310b), flow indicators (320a and 320b), event processing queries (330a, 330b and 330c), intermediate nodes (340a and 340b), and sink node 350. One or more data flows may exist as part of event stream processing application 212.

Diagram 300 illustrates a graph representing a data flow having a plurality of interconnected nodes and data processing queries. Source nodes 310a and 310b serve as entry points where incoming data enters the data flow. Flow indicators 320a and 320b show the directional flow of data between event processing queries and nodes. Event processing queries 330a, 330b and 330c are used to process data and may, for example, perform one or more processing activities that include, but not limited to filtering data, combining queries, joining multiple data sources, aggregating data, and pattern matching.

Intermediate nodes 340a and 340b contain query processing results and may store the results (i.e. rows, objects, data stream, etc.). Sink node 350 is the endpoint for the data flow illustrated in diagram 300 and may store data flow results for further processing. For example, sink node 350 may be used to collect and send data externally (i.e., systems, individuals, data flows, feeds, etc.).

In an embodiment, event processing queries such as 330a, 330b and 330c, are decomposed into one or more primitive operations that execute in the context of a thread. In a single-threaded environment, ordering of incoming rows typically must be performed in a precise order, which may be implemented using priorities of the edges and/or a scheduling algorithm.

Figure 4:
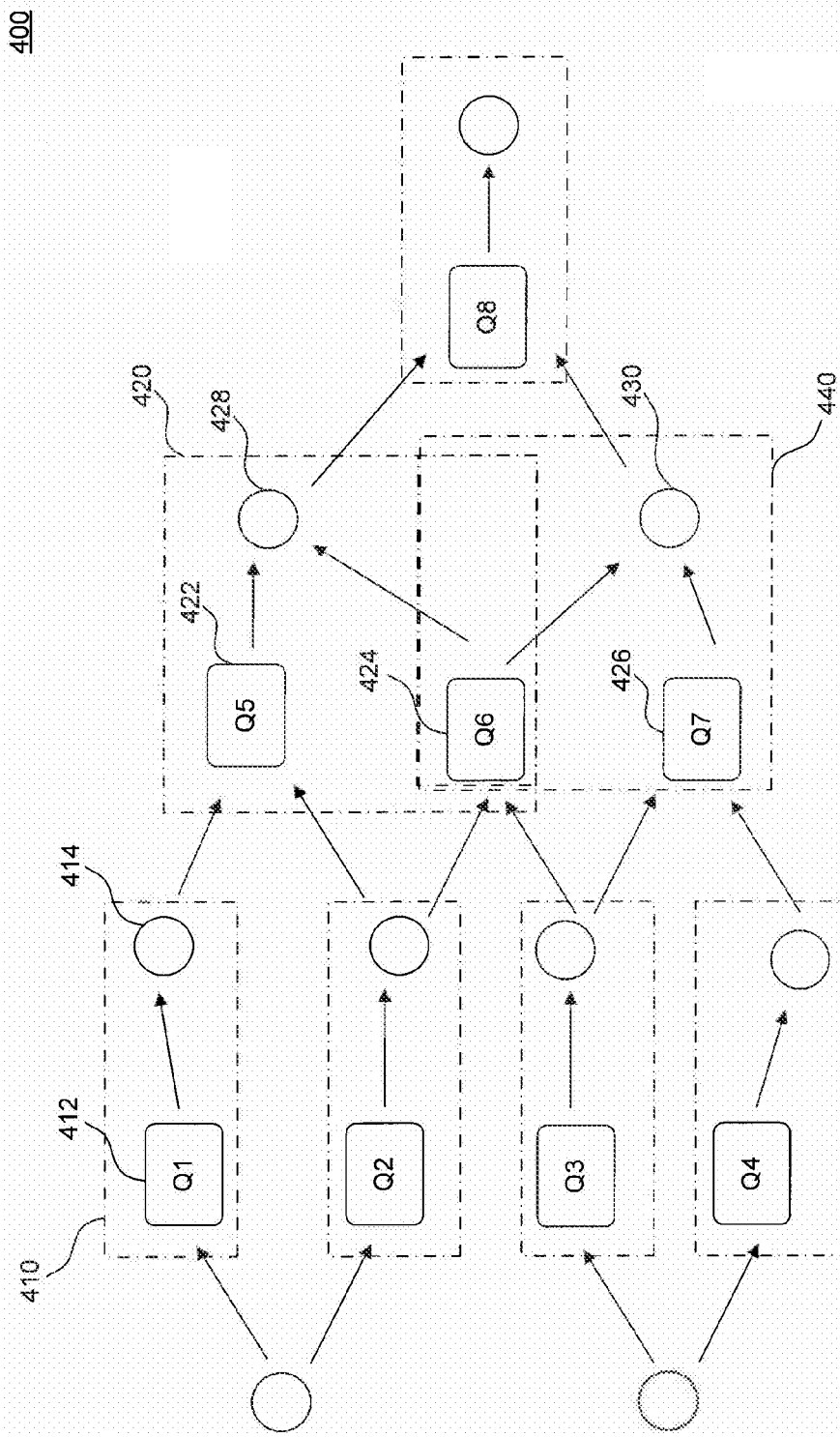
FIG. 4 is a diagram illustrating query coalescing for an event stream processing data flow, according to an embodiment.

FIG. 4 is a diagram illustrating query coalescing for an event stream processing data flow, according to an embodiment. The example of diagram 400 generally represents the same data flow structure presented in diagram 300.

Logical units 410, 420 and 440 each represent a grouping of one or more data flow queries and a resulting state. In logical unit 410, processing of query 1 (Q1) 412 results in state 414. In logical unit 420, both Query 5 (Q5) 422 and Query 6 (Q6) 424 result in state 428. Further, processing of Query 6 (Q6) 424 and Query 7 (Q7) 426 result in state 430. Logical units 420 and 440 each illustrate that when two or more queries are used to define a state, a union of the queries also may be used to define the state.

When each state has an input queue populated by its producers (i.e., upstream nodes), as depicted in diagram 400, no scheduling is required to handle the data. Thus, the data flow is considered completely parallel and scales well with respect to processing power.

In an embodiment, an extensible execution modeling language is used to create one or more complex event processing executables from lower level primitives based on a data flow paradigm. For example, one or more aspects of a data flow, including nodes, queries, relationships between nodes and queries, and one or more primitives used as processing logic within queries and/or other parts of a data flow may be represented in an XML format. Further, these and other aspects of a data flow may be extracted from one or more data flow definition sources, including source code 222, to logically represent one or more aspects of a data flow and/or data flow processing in an XML-based format.

In an embodiment, queries may comprise one or more relational and/or non-relational operators called primitives. For example, primitive operations may include, but are not limited to, an input source stream primitive, a filter primitive, a compute primitive, a copy primitive, an aggregate primitive, a union primitive, a flex primitive, a join primitive, a pattern primitive, and an external call primitive. Such primitives may be configured to process information provided by, for example, infinite tables (i.e., streams) and/or other data sources.

According to another embodiment, the XML definitions may be produced as executable computer code 232, which may then be implemented and executed by Complex Event Processing (CEP) engine 230 (configured to process and carry out the instructions provided in the extensible format). Such definitions may be used to create functional building blocks, which then may be reused within and across multiple applications.

In another embodiment, a continuous computation executable (CCX) is an XML-based representation of event stream processing application 212, which may be used to define, utilize, combine, and reuse data flow structure(s) and logic. For example, primitives and combinations of primitives may be compiled into reusable modules. Compiled modules then may be used, for example, to assemble applications and efficiently organize application logic, among other things. In another embodiment, Query 5 (Q5) 422, Query 6 (Q6) 424 and Query 7 (Q7) may each represent one or more primitives and/or units of processing logic used to process data, the functionality of which may be combined and reused throughout an application.

In a further embodiment, CCX is an XML-based representation of compiled event stream processing application 212 source code 222. For example, CCX or any similarly configured XML-based format may be used to logically represent of one or more aspects of a complex query graph, such as the data flow depicted in diagram 400. Further, the XML-based representation of a data flow may be executed at runtime by a Complex Event Processing (CEP) engine 230 to perform complex event stream processing.

In another embodiment, CCX may be used to represent one or more structural and/or process-related aspects of a data flow as XML. For example data flow nodes (such as intermediate nodes 340a and 340b), may be represented, as "ProcessNodes" in XML, while data flow event processing queries 330a, 330b and 330c may be represented as "ProcessLogic". Further, "ProcessLogic" may include one or more collections and/or combinations of primitives for processing data.

According to an embodiment, CCX executable computer code 232 does not require any additional compilation because it is interpreted by Complex Event Processing Engine (CEP) 230. Also, since CCX is an XML-based representation, it is a human-readable executable that may be implemented on any platform having Complex Event Processing Engine (CEP) 230. For example, CEP engine 230 may accept one or more CCX files and possibly one or more additional files and/or information relating to configuration, deployment and launching of an application.

In an embodiment, one or more primitives may be compiled into a module. Compiled modules then may be used to assemble various functionality associated with event stream processing application 212. Thus, modules may be integrated with various other modules and primitives to build a desired data flow stream to process data.

In another embodiment, a module may be thought of as a logically independent, reusable component that may be leveraged within an existing application and/or by other applications and modules. For example, modules can be nested within and/or called by other modules.

In a further embodiment, compiler 220, decides how to best integrate compiled modules based on one or more existing modules within an application and one or more locally and/or externally available modules accessible to an application. In yet another embodiment, modules may be integrated manually, for example, by importing a module using a file definition.

In an embodiment, each module is only compiled once, regardless of whether a module has been loaded or how many times it has been loaded. In another embodiment, compiler 220 prevents modules referencing each other from creating an infinite loop by checking for such cycles during compilation of source code 222.

Figure 5:
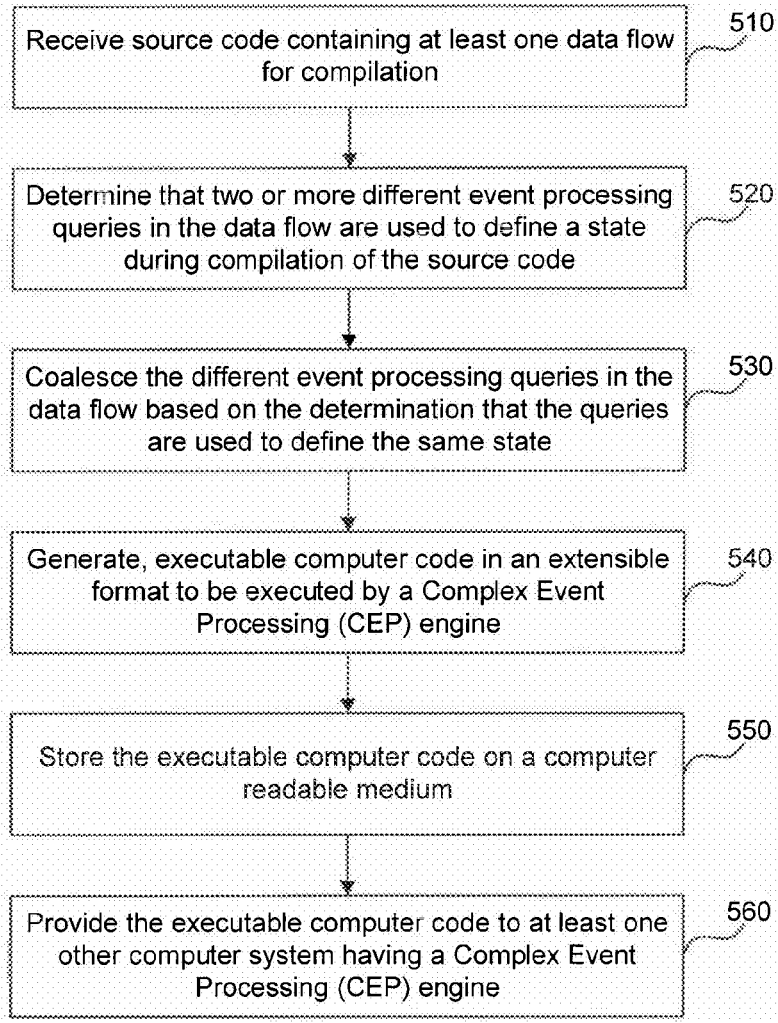
FIG. 5 is a flow diagram illustrating a method for coalescing different processing queries in a data flow, according to an embodiment.

FIG. 5 is a flow diagram 500 illustrating a method for coalescing different processing queries in a data flow, according to an embodiment.

At step 510, source code 222 containing at least one data flow for implementing event stream processing is received for compilation. In an embodiment, application development environment 210 may be used to create event stream processing application 212 containing one or more data flows and logic necessary to perform event stream processing/complex event processing.

In another embodiment of step 510, compiler 220 receives and compiles source code 222, generating executable computer code 232 in an extensible format capable of being executed by Complex Event Processing (CEP) engine 230. In yet another embodiment, source code 222 contains at least one data flow or at least represents at least one data flow to implement event stream processing operations. Compilation of source code 222 may include one or more of steps 520-560 and may also include one or more other pre-processing, post-processing, and intermediate steps.

At step 520, a determination is made that two or more different event processing queries of a data flow in source code 222 are used to define a state. According to an embodiment, compiler 222 determines that two or more different event processing queries in a data flow determine a single state and can be combined and still produce the same state.

For example, a first query within a data flow may define a filtering operation and an immediately subsequent second query within the data flow may define a compute operation. Used together, these queries may be used to produce an intermediate or ending result within the data flow.

In another embodiment, compiler 222 determines that two or more event processing queries within a data flow of the event stream processing application 212 or source code 222 are used to define the same state or result. In farther embodiments, compiler 222 may determine that one or more primitives and/or queries within a data flow can be merged, restructured, and/or optimized in various ways.

For example, compiler 222 may calculate and evaluate one or more possible execution plans that could be used to generate executable computer code 232. According to another embodiment, compiler 222 may determine that it is beneficial to consolidate and/or reuse logic and/or operations provided by one or more data flow queries and/or groupings of primitives (including units of processing logic) in source code 222 and/or one or more modules of previously compiled executable computer code 232.

In yet a further embodiment, functionality performed by one or more queries may be repeated in one or more data flows existing within event stream processing application 212. Compiler 220 may consolidate the repeated functionality into reusable building blocks that may be flexibly assembled, organized, and reused in various ways throughout executable computer code 232. Such construction and reuse of identified common functionality within executable computer code 232 may be facilitated by producing executable computer code 232 in an extensible format executable by a Complex Processing Engine (CEP) 230.

At step 530, the different event processing queries in the data flow of the event stream processing application 212 or source code 222 are coalesced during compilation of source code 222 received in step 510. In an embodiment, two or more different primitives and/or queries are coalesced based on the determination made in step 520.

For example, a first query configured to perform a filter operation and a second query configured to perform a compute operation may exist as consecutive operations within a data flow. Thus, the filter and the compute operations may be coalesced into a single query configured to perform the operations in the same order to achieve the same state and result.

At step 540, executable computer code 232 is generated from event stream processing application 212 during compilation of source code 222 received in step 510. In an embodiment, the executable computer code 232 is produced in an extensible format by compiler 220 to be executed by Complex Event Processing (CEP) engine 230.

In another embodiment, executable computer code 232 is generated in an XML format that can be read, processed, and executed by CEP engine 230, which is configured to understand and execute the instructions presented in an XML-based format. In a further embodiment, executable computer code 232 contains at least one representation of a data flow from source code 222 to implement event stream processing. For example, a computer system may be configured to receive and interpret executable computer code 232 to create runtime data structures and to process data arriving from an incoming stream.

According to another embodiment, one or more parts of event stream processing application 212 are coded in Continuous Computation Language (CCL) and/or another computer language designed and configured to perform operations to support and carry out event stream processing/complex event processing on one or more computer systems. Compiler 220 then compiles this source code 222, producing executable computer code 232. Compiler 220 may produce executable computer code 232 in an XML format, such as Continuous Computation Execution (CCX) language, which then can be executed by a Complex Event Processing (CEP) engine 230.

At step 550, executable computer code 232 is optionally stored on a computer readable medium. In an embodiment, compiler 220 may store executable computer code 232 on one or more local and/or remote computer systems and/or storage devices. For example, computer code 232 may be stored on computer readable media for purposes including, but not limited to preservation and execution.

At step 560, executable computer code 232 is provided to at least one other computer system having a Complex Event Processing (CEP) engine 230. According to an embodiment, executable computer code 232 is transferred from the location of compiler 220 to another location on or accessible to a computer system with a Complex Event Processing (CEP) engine 230 configured to run executable computer code 232.

For example, executable computer code 232 may be provided electronically using one or more wired and/or wireless networks. In another example, executable computer code 232 may be stored on a computer readable medium that can be used to access, distribute, and/or run executable computer code 232.

In another embodiment, CEP engine 230 is configured to execute instructions provided by executable computer code 232, which may exist in one of many formats (i.e. binary, bytecode, XML, etc.). For example, when running executable computer code 232 CEP engine 230, may perform activities, such as, processing of real-time event data from multiple sources by tracking, analyzing, and correlating such data. In further embodiments CEP engine 230 executes the instructions and methods provided by executable computer code 232 to perform other activities associated with complex event processing.

Figure 6:
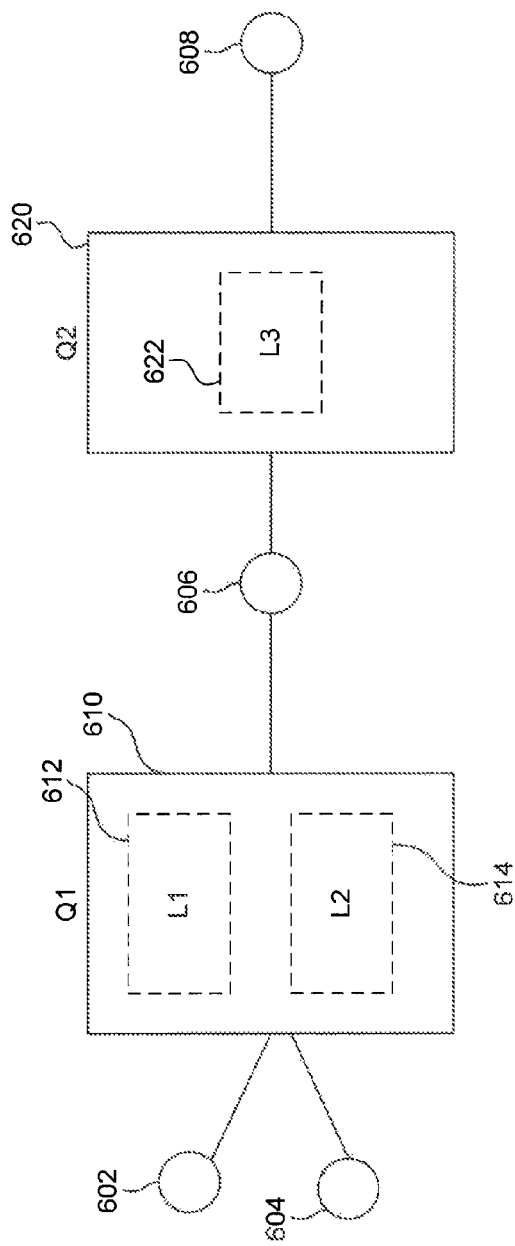
FIG. 6 is a data flow diagram illustrating processing logic, according to an embodiment.

FIG. 6 is a data flow diagram illustrating processing logic, according to an embodiment. The example of diagram 600 includes source nodes 602 and 604, intermediate node 606, and sink node 608. Further, query 1 (Q1) 610 includes processing logic units (L1) 612 and (L2) 614, while query 2 (Q2) 620 includes processing logic unit (L3).

In an embodiment, source nodes 602 and 604 represent data source streams where incoming data arrives from one or more data sources by way of at least one input adapter 120. For example, one or more input adapters 120 may be configured to send data from one or more data sources 110 to one or more data flow source nodes for processing. Source nodes 602 and 604 represent data flow entry points where data arrives and is accepted for further processing using logic and instructions provided by a data flow.

In example diagram 600, data received by either source node 602 or source node 604 is sent to query 1 (Q1) 610 for processing. Query 1 (Q1) 610 includes two units of processing logic (L1) 612 and (L2) 614, which may be used to process incoming data. In other embodiments, a query may contain one or more processing logic units (i.e., functions), which may call and/or rely on one or more other internal/external units of processing logic. Additionally, processing logic units may contain one or more primitive instructions and/or one or more calls to other processing logic units.

Table 1 below provides an example illustration of representing program logic in an extensible format. In the example of Table 1, a program contains multiple processing logic units (referred to as functions), each containing one or more primitive instructions and/or calls to other processing logic units. According to an embodiment, a program section may contain programmatic logic as bytecode instructions provided in an extensible format. In a further embodiment, executable bytecode instructions are included in the program section as set of instructions encompassed inside of one or more functions.

TABLE 1

Example of an Extensible Program Logic Representation

```
<Program>
    <Function1>
        <Instruction1/>
        <Instruction2/>
        ...
    </Function1>
    <Function2>
        ...
    </Function2>
    <FunctionX>
        ...
    </FunctionX>
    ...
</Program>
```

According to another embodiment, logic provided in a program section, such as the example illustration of Table 1 above, defines the actions to be executed on data when, for example, the data is received at a node and/or an event occurs. Further, logic defining an actual data flow and the flow of data between queries and nodes may be defined in a processing logic section, as illustrated by example in Table 2 below.

Continuing with example diagram 600, results of query 1 (Q1) 610 are provided to intermediate node 606, which are then sent to query 2 (Q2) 620 for further processing. Finally, results of query 2 (Q2) 620 processing are provided to sink node 608. In an embodiment, sink node 608 may be associated with one or more output adapters 160, for example, to provide data flow processing results to other processes and/or systems.

Table 2 provides an example extensible data flow representation of the data flow illustrated in example diagram 600. The example representation provided in Table 2 defines two separate source streams (source_node1 and source_node2), which correspond respectively to source node 602 and source node 604. Processing logic units (L1) 612, (L2) 614, and (L3) 622 are referred to as "ProcessingLogic" using "Logic1", "Logic2" and "Logic3".

The example representation provided by Table 2 includes a compute stream, which may have one or more processing nodes each associated with one or more units of processing logic. The illustration provided in Table 2 is configured to process data received from "Stream1" using processing logic "Logic 1", which represents "L1" in FIG. 6. Processing logic "Logic1" executes the program logic "Function1", which according to an embodiment, is defined as a set of instructions and/or function calls in a program block. Data processed using Process Logic "Logic1" is then sent to processing node "node1", which represents intermediate node 606. Data received from "Stream2" is processed by process logic "Logic2", which is represented by "L2" in FIG. 6. Processing Logic "Logic2" uses program logic in "Function2" to process the data and also provides results to "node1". All data received by "node1" is processed using program logic associated with "Logic3", which is "FunctionX". Results are sent to "node2", which represents sink node 608. In another embodiment, each processing logic unit may have an assigned priority to indicate the order in which the logic needs to be executed. In further embodiments, each processing node may be associated with one or more units of processing logic.

TABLE 2

Example of an Extensible Data Flow Representation

```
<SourceStream name="Stream1">
    <Schema>
        ...
    </Schema>
    <Processing Logic priority="0" to="query1"/>
    <Processing Node name="source_node1"/>
</SourceStream>
<SourceStream name="Stream2">
    <Schema>
        ...
    </Schema>
    <Processing Logic priority="0" to="query1"/>
    <Processing Node name="source_node2"/>
</SourceStream>
<ComputeStream name="Compute1" from="Stream1 Stream2">
    <Schema>
        ...
    </Schema>
    <ProcessingLogic name="Logic1" priority="0" from="Stream1"
        to="node1" label="Function1"/>
    <ProcessingLogic name="Logic2" priority="0" from="Stream2"
        to="node1" label="Function2"/>
    <ProcessingNode name="node1"/>
    <ProcessingLogic name="Logic3" priority="1" from="node1"
        to="node2" label="FunctionX"/>
    <ProcessingNode name="node2"/>
</ComputeStream>
```

Example Computer System

Figure 7:
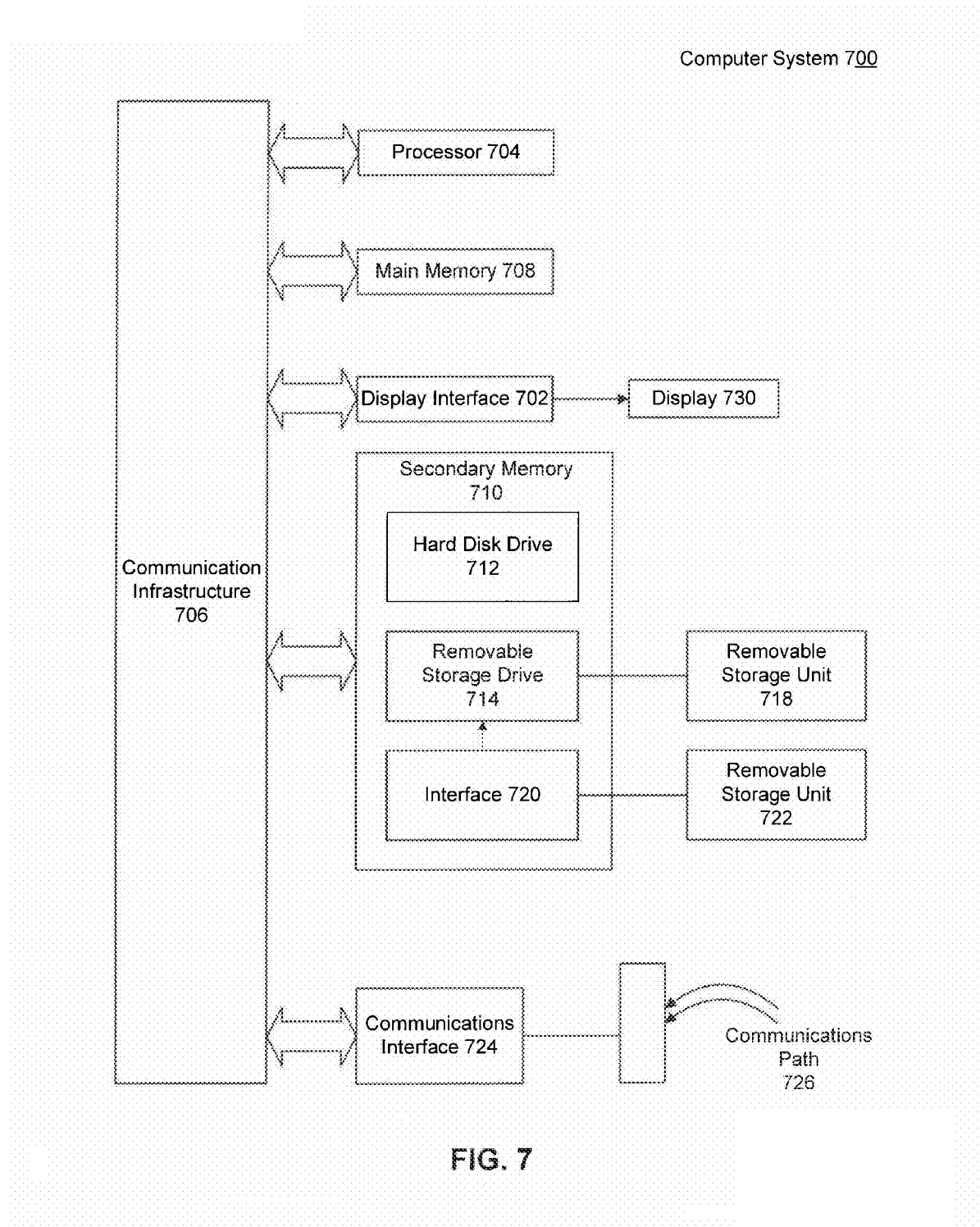
FIG. 7 is a diagram of an exemplary computer system that may be used in an embodiment.

In an embodiment, the system and components of embodiments described herein are implemented using well-known computers, such as one or more example computer systems 700 shown in FIG. 7.

Computer system 700 includes one or more processors (also called central processing units, or CPUs), such as a processor 704. Processor 704 is connected to a communication infrastructure 706.

Computer system 700 also includes a main or primary memory 708, such as random access memory (RAM). Main memory 708 has stored control logic (computer software), and data.

Computer system 700 may also include one or more secondary storage devices 710. Secondary storage device 710 includes, for example, a hard disk drive 712 and/or a removable storage device or drive 714, as well as other types of storage devices, such as memory cards and memory sticks. Removable storage drive 714 represents a floppy disk drive, a magnetic tape drive, a compact disk drive, an optical storage device, tape backup, etc.

Removable storage drive 714 may interact with a removable storage unit 718. Removable storage unit 718 includes a computer usable or readable storage device having stored thereon computer software (control logic) and/or data. Removable storage unit 718 represents a floppy disk, magnetic tape, compact disk, DVD, optical storage disk, or any other computer data storage device. Removable storage drive 714 may read from and/or write to removable storage unit 718 in a well-known manner.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 also includes input/output/display devices 730, such as monitors, keyboards, pointing devices, etc., which communicate with communication infrastructure 706 through a display interface 702.

Computer system 700 further includes a communication or network interface 724. Communication interface 724 may enable computer system 700 to communicate with remote devices. For example, communication interface 724 may allow computer system 700 to communicate over communications path 726, such as LANs, WANs, the Internet, etc. Communications interface 724 may interface with remote sites or networks via wired or wireless connections.

Control logic may be transmitted to and from computer system 700 via communication path 726.

Any tangible apparatus or article of manufacture comprising a computer useable or readable medium having control logic (software) stored thereon is referred to herein as a computer program product or program storage device. This includes, but is not limited to, computer system 700, main memory 708, secondary storage device 710, and removable storage unit 718. Such computer program products, having control logic stored thereon that, when executed by one or more data processing devices, causes such data processing devices to operate as described herein, represent embodiments of the invention.

Embodiments can work with software, hardware, and/or operating system implementations other than those described herein. Any software, hardware, and operating system implementations suitable for performing the functions described herein can be used. Embodiments are applicable to both a client and to a server or a combination of both.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described embodiments.

In addition, the foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for generating executable computer code in an extensible format, comprising:
    receiving computer source code containing at least one data flow comprising a plurality of different event processing queries for compilation;
    compiling the source code, to generate executable computer code in an extensible format, wherein the executable computer code includes instructions to be executed by a computer system configured to process the instructions in the extensible format; and
    coalescing, during the compiling, the plurality of different event processing queries in the at least one data flow.

2. The method of claim 1, further comprising:
    providing the executable computer code in the extensible format to the computer system for execution.

3. The method of claim 1, wherein the at least one data flow is configured to implement event stream processing.

4. The method of claim 3, further comprising:
    determining, during the compiling, that the plurality of different event processing queries in the at least one data flow are used to define a same state.

5. The method of claim 4,
    wherein the coalescing is based on the determination that the plurality of different event processing queries are used to define the same state.

6. The method of claim 5, wherein the generated executable computer code includes the plurality of different event processing queries as coalesced.

7. The method of claim 1, wherein the computer system includes a Complex Event Processing (CEP) engine configured to execute the executable computer code in the extensible format.

8. A system for generating executable computer code in an extensible format, comprising:
    one or more processors;
    a module configured to receive, using the one or more processors, source code containing at least one data flow comprising a plurality of different event processing queries for compilation;
    a module configured to compile the source code, using the one or more processors, to generate executable computer code in an extensible format, wherein the executable computer code includes instructions to be executed by a computer system configured to process the instructions in the extensible format; and
    a module configured to coalesce, during the compiling and using the one or more processors, the plurality of different event processing queries in the at least one data flow.

9. The system of claim 8, further comprising:
a module configured to provide the executable computer code in the extensible format to the computer system for execution.

10. The system of claim 8, wherein the at least one data flow is configured to implement event stream processing.

11. The system of claim 10, further comprising:
a module configured to determine, during the compiling and using the one or more processors, that the plurality of different event processing queries in the at least one data flow are used to define a same state.

12. The system of claim 11,
wherein the coalescing is based on the determination that the plurality of different event processing queries are used to define the same state.

13. The system of claim 12, wherein the generated executable computer code includes the plurality of different event processing queries as coalesced.

14. The system of claim 8, wherein the computer system includes a Complex Event Processing (CEP) engine configured to execute the executable computer code in the extensible format.

15. A non-transitory computer readable medium having instructions stored thereon that, when executed by a processor, cause the processor to perform operations to generate executable computer code in an extensible format, the operations comprising:
receiving computer source code containing at least one data flow comprising a plurality of different event processing queries for compilation;
compiling the source code, to generate executable computer code in an extensible format, wherein the executable computer code includes instructions to be executed by a computer system configured to process the instructions in the extensible format; and
coalescing, during the compiling, the plurality of different event processing queries in the at least one data flow.

16. The non-transitory computer readable medium of claim 15, further comprising:
providing the executable computer code in the extensible format to the computer system for execution.

17. The non-transitory computer readable medium of claim 15, wherein the at least one data flow is configured to implement event stream processing.

18. The non-transitory computer readable medium of claim 17, further comprising:
determining, during the compiling, that the plurality of different event processing queries in the at least one data flow are used to define a same state.

19. The non-transitory computer readable medium of claim 18, wherein the coalescing is based on the determination that the plurality of different event processing queries are used to define the same state.

20. The non-transitory computer readable medium of claim 19, wherein the generated executable computer code includes the plurality of different event processing queries as coalesced.

21. The method of claim 1, the coalescing further comprising:
coalescing the plurality of different event processing queries in the at least one data flow into a query in the at least one data flow.

\* \* \* \* \*